US011285534B2

(12) United States Patent
Yacout et al.

(10) Patent No.: US 11,285,534 B2
(45) Date of Patent: Mar. 29, 2022

(54) METHOD FOR NANO POWDER LOADING INTO MICRO-CAPILLARY MOLD

(71) Applicant: UCHICAGO ARGONNE, LLC, Chicago, IL (US)

(72) Inventors: Abdellatif M. Yacout, Naperville, IL (US); Sumit Bhattacharya, Darien, IL (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 584 days.

(21) Appl. No.: 16/147,347

(22) Filed: Sep. 28, 2018

(65) Prior Publication Data
US 2020/0101532 A1 Apr. 2, 2020

(51) Int. Cl.
*B22F 3/00* (2021.01)
*B22F 1/00* (2006.01)
(Continued)

(52) U.S. Cl.
CPC ............ *B22F 3/004* (2013.01); *B22F 1/0022* (2013.01); *B22F 1/0074* (2013.01); *B22F 3/093* (2013.01); *C01G 43/01* (2013.01); *C01G 56/00* (2013.01); *C22C 28/00* (2013.01); *B22F 2202/01* (2013.01); *B22F 2301/10* (2013.01); *B22F 2301/15* (2013.01); *B22F 2302/253* (2013.01); *B22F 2304/054* (2013.01);
(Continued)

(58) Field of Classification Search
CPC ........ B22F 3/004; B22F 1/0074; B22F 3/093; B22F 1/0022; B22F 2202/01; B22F 2301/10; B22F 2301/15; B22F 2302/253; B22F 2304/054; B22F 2304/056; B22F 2304/058; B22F 2304/10; B22F 2998/10; B22F 2999/00; C01G 43/01; C01G 56/00; C22C 28/00; B82Y 30/00; B82Y 40/00
See application file for complete search history.

(56) References Cited

U.S. PATENT DOCUMENTS 9,248,501 B1 * 2/2016 Johannes .............. B22F 1/0096
2016/0038418 A1 2/2016 DeSimone et al.

OTHER PUBLICATIONS

Fang et al., The effects of filling patterns on the powder-binder separation in powder injection molding, Powder Technology, 256:367-76 (Apr. 2014).
(Continued)

*Primary Examiner* — Rebecca Janssen
(74) *Attorney, Agent, or Firm* — Marshall, Gerstein & Borun LLP

(57) ABSTRACT

A method loading powder into a mold can include immersing the mold comprising one or more microchannels into a suspension comprising the powder and a surfactant suspended in a dispersant, wherein the powder comprises particles having an average particle size of less than 100 µm, wherein the mold is substantially entirely covered by the suspension; heating the suspension having the mold immersed therein under a temperature condition suitable to lower the stability of the particles of the powder in the suspension such that the particles settle out of solution and into the one or more microchannels; and applying an ultrasonic wave to the heated suspension to further settle the particles of the powder into the one or more microchannels thereby filling the one or more microchannels of the mold with the powder.

19 Claims, 3 Drawing Sheets

(51) Int. Cl.
  B22F 3/093    (2006.01)
  C01G 43/01    (2006.01)
  B82Y 30/00    (2011.01)
  C01G 56/00    (2006.01)
  C22C 28/00    (2006.01)
(52) U.S. Cl.
  CPC ... *B22F 2304/056* (2013.01); *B22F 2304/058* (2013.01); *B22F 2304/10* (2013.01); *B82Y 30/00* (2013.01)

(56) References Cited

OTHER PUBLICATIONS

Lee et al., Microchip for sustained drug delivery by diffusion through microchannels, AAPS PharmSciTech, 13(1):211-7 (Mar. 2012).

Pijolat et al., Application of carbon nano-powders for a gas micro-preconcentrator, Sensors and Actuators B: Chemical, 127(1):179-85 (Oct. 2007).

Shimizu et al., A Slurry Injection Method for the Fabrication of Multiple Microchannel SOFCs, J. Am. Ceram. Soc., 92(5):1002-5 (May 2009).

* cited by examiner

METHOD FOR NANO POWDER LOADING INTO MICRO-CAPILLARY MOLD

STATEMENT OF GOVERNMENT INTEREST

This invention was made with government support under grant number DE-AC02-06CH11357 awarded by the Department of Energy. The government has certain rights in the invention.

BACKGROUND

Field of the Invention

The disclosure relates to a method of loading nano-powders into a microcapillary mold, and more particularly to a method of loading nano-powders into a microcapillary mold using a colloidal bath aided with ultrasonic wave propagation.

Brief Description of Related Technology

Ultra-fine powder-based fabrication technologies have emerged including various microchannel applications and pharmaceutical studies, which demand exact control over composition. In order to deposit powders in micron levels or to precisely control the composition of the desired product, it is necessary to feed powders continuously at controlled flow rate. Dry powder loading and powder slurry injection loading are the most prominent conventional methods.

Generally, dry particles larger than 100 μm have good flowability and are easy to load/feed. Micro- and nano-sized powders, however, tend to agglomerate due to their large surface to volume ratio. It can be challenging to feed such ultra-fine powders, especially dry powders, through a micro tube. This process also leads to handling loose nano-powders, which can be dangerous, particularly in the case of radioactive or active powders of carcinogenic nature.

Slurry injection is often used for feeding of micron-sized powders and forming micro-structure metallic parts, but it is difficult to fill feedstock completely into a narrow cavity and demold fragile green compacts from a metallic mold in the injection molding process. Careful handling is also required in the debinding and sintering processes. Slurry injection processes face technical problems including measuring density, and achieving or maintaining the desired shape and mechanical properties of sintered parts. The use of finer powder is essential in the slurry injection process to fill the feedstock into cavities having a size on the order of several tenths to a few microns. However, such nano-sized powder has extremely high specific surface area, and thus the tap density is very low resulting in the viscosity of the feedstock increasing dramatically. The process using nano-sized particles is also susceptible to oxidation and relatively high production costs. While the fluidity of the feedstock can be improved in a slurry injection process by increasing the binder content, such increase lowers the quality and adversely affects the mechanical properties of the sintered parts, as the density of the green compact becomes lower and the remaining carbon content increases.

Both dry powder loading and slurry injection process have difficulties in handling non-spherical powders. It becomes difficult with such processes to infiltrate with non-spherical particles inside of intricate micro channel mold features. While slurry injection process can utilize adjustment of pressure, the increases in pressure increases the chance of mold breakage.

SUMMARY

In accordance with an embodiment, a method of loading powder into a mold can include immersing the mold comprising one or more microchannels into a suspension comprising the powder and a surfactant suspended in a dispersant. The powder can have particles having an average particle size of less than 100 μm. The mold can be substantially entirely covered by the suspension. The method can further include heating the suspension having the mold immersed therein under a temperature condition suitable to lower the stability of the particles of the powder in the suspension such that the particles settle out of solution and into the one or more microchannels. The method can also include applying an ultrasonic wave to the heated suspension to further settle the particles of the powder into the one or more microchannels thereby filling the one or more microchannels of the mold with the powder.

The method can further include in embodiments removing the mold from the suspension once loaded and sintering the mold.

DETAILED DESCRIPTION

Figure 1:
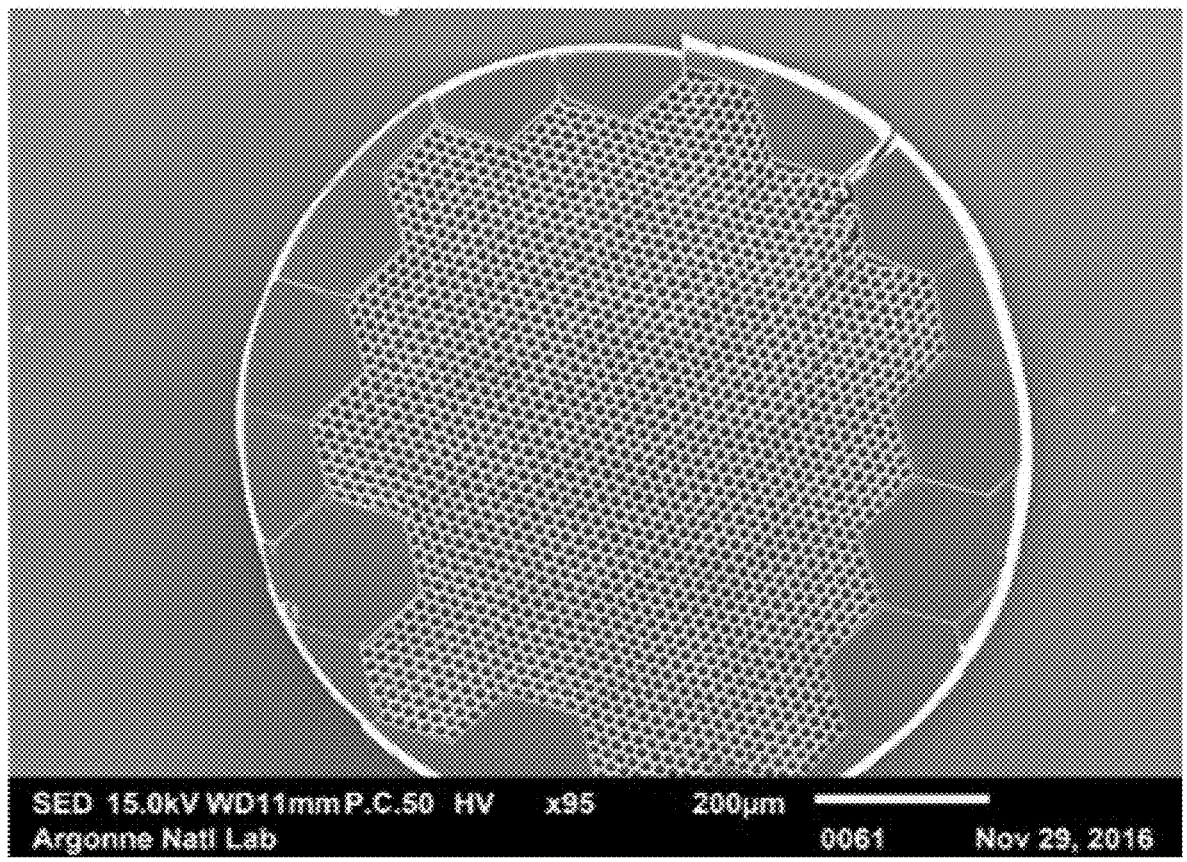
FIG. 1 is an illustration of a mold having a plurality of micron-sized channel features.

In accordance with an embodiment, a method of loading powder can include use of a colloidal suspension of the powder and the aid of an ultrasonic wave. The methods in accordance with embodiments of the disclosure can advantageously allow for loading of nano to ultra-nano powders to achieve dense filling intricate micron sized mold features. Methods in accordance with embodiments can allow for improved safety in handling nano and ultra-nano size powders, particularly as compared to dry powder processing.

In an embodiment, a method of loading powders into a micron-sized feature of a mold can include immersing the mold having the micron-sized feature into a suspension comprising the powder to be loaded and a surfactant suspended in a dispersant such that the micron-sized feature of the mold is substantially entirely covered by the suspension. The method can further include heating the suspension having the mold immersed therein to a temperature selected to lower the stability of the particles of the powder in the suspension such that the particles settle out of solution and deposit into the micron-sized feature of the mold. The method can further include applying an ultrasonic wave to the heated suspension or while the suspension is heating to further settle the particles of the powder into the micron-sized feature, thereby filling the micron-sized feature with the powder.

In accordance with embodiments, the mold can be immersed or substantially immersed in the suspension. For example, the mold can be immersed in the suspension such that the micron-sized features are substantially or entirely covered, while other portions of the mold remain exposed out of the suspension. In embodiments, the mold can be immersed in the suspension such that openings of the micron-sized features are disposed in the suspension.

In accordance with embodiments, the method can include applying the heat and subsequently applying the ultrasonic wave once the suspension has reached the desired heated temperature. In alternative embodiments, the method can include applying the heat and the ultrasonic wave at the same or substantially the same time. In yet other embodiments, the method can include heating the suspension and applying the ultrasonic wave at some point in time after heating begins but before the suspension has reached the desired temperature.

In accordance with embodiments, the suspension can be heated to a temperature of about 50° C. to about 150° C., about 75° C. to about 125° C., about 80° C. to about 100° C., about 50° C. to about 75° C., or about 60° C. to about 85° C. Other temperatures include about 50, 52, 54, 56, 58, 60, 62, 64, 66, 68, 70, 72, 74, 76, 78, 80, 82, 84, 86, 88, 90, 92, 94, 96, 98, 100, 105, 110, 115, 120, 125, 130, 135, 140, 145, and 150° C. In embodiments, the temperature of heating can be adjusted based on the surfactant chosen. For example, the temperature can be selected to be high enough that the surfactant becomes unstable, but below the degradation temperature of the surfactant. Without intending to be bound by theory, it is believed that the heating lowers the stability of the powder in the solution as the surfactant slowly decomposes, as well as reduces the viscosity of the fluid to enhance flow. The temperature is selected to slowly decompose the surfactant so that the particles of the powder settle out of suspension at a controlled rate. Rapid decomposition of the surfactant, such as by applying higher temperatures, would cause rapid settling of the particles, which could result in agglomeration or otherwise reduce the loading efficiency into the mold cavity or cavities.

In accordance with embodiments, the frequency of the ultrasonic wave can vary depending on the particle size of the powder to be loaded. In embodiments, the frequency can be about bout 5 KHz to about 5 MHz, about 5 KHz to about 1 MHz, about 5 KHz to about 100 KHz, about 100 KHz to about 500 KHz, about 5 KHz to about 20 KHz, about 1 MHz to about 5 MHz, and about 2 MHz to about 4 MHz. Other suitable frequencies include, for example, about 5 KHz, 10 KHz, 20 KHz, 30 KHz, 40 KHz, 50 KHz, 60 KHz, 70 KHz, 80 KHz, 90 KHz, 100 KHz, 150 KHz, 200 KHz, 250 KHz, 300 KHz, 350 KHz, 400 KHz, 450 KHz, 500 KHz, 550 KHz, 600 KHz, 650 KHz, 700 KHz, 750 KHz, 800 KHz, 850 KHz, 900 KHz, 950 KHz, 1 MHz, 1.5 MHz, 2 MHz, 2.5 MHz, 3 MHz, 3.5 MHz, 4 MHz, 4.5 MHz, and 5 MHz. Without intending to be bound by theory, it is believed that the application of the ultrasonic wave aids in preventing or reducing blockages in the cavities during loading. The ultrasonic wave can break open blockages that may form within channels, thereby allowing the powder particles to settle to the bottom of the cavity and fully fill the cavity. This phenomenon is known as Acoustic streaming, where a high intensity acoustic wave propagates in liquid, a pressure gradient in the direction of the wave propagation can be generated by the acoustic nonlinearity. When this gradient is large, a body force will be exerted on the liquid and the powder loaded in the fluid is then forced to move with the wave. Without intending to be bound by theory, it is also believed that the application of the ultrasonic wave aids in keeping the powder particles from forming agglomerates as they settle. It is also believed that the ultrasonic wave can aid in enhancing the powder compaction and aids in removing any trapped gas bubbles within the cavity, both of which can improve the loading density. Control over the frequency is important, as frequencies too high, for example, above 5 MHz can force the powder back into suspension, and too small a frequency, for example, below 50 Hz will not sufficiently break blockages in the channel, leading to ineffective loading.

The amount of time the ultrasonic wave is applied can vary depending on the size, number, and intricacies of the mold and micron-sized feature to be loaded. In accordance with embodiments, the ultrasonic wave can be applied for a time on the order of minutes to a time on the order of hours.

In various embodiments, the mold can be immersed in the suspension, heated, and the ultrasonic wave can be applied for a first duration of time. The load level of the mold can then be checked by removing the mold from the suspension and if not filled to the desired load level, the mold can be re-immersed in the suspension or a new suspension, the suspension heated and the ultrasonic wave applied for a second duration of time for further fill the mold. It is contemplated herein that the mold can be removed and checked and re-immersed for further loading any number of times until the mold is filled to the desired level.

In accordance with embodiments, the method can include immersing the mold in a suspension containing a first powder, heating and applying the ultrasonic wave for a first duration of time to partially fill the mold with the first powder and then can be immersed in a second suspension having a second powder, heated and have the ultrasonic wave applied to fill the remaining space in the mold with the second powder. In embodiments, the second powder can be layered on top the first powder. In other or further embodiments, one or more micron-sized features can be blocked during loading of the first powder and then exposed during loading of the second powder to thereby obtain micron sized features filled with a first powder and micron sized features filled with a second powder. Any number of different powders and/or powder layers are contemplated in any of the foregoing embodiments.

In accordance with embodiments, after the ultrasonic wave is applied and the mold is loaded with powder to the desired level, the mold can be removed from the suspension and decanted. The mold can be decanted to remove as much of the suspension as possible in various embodiments.

In accordance with embodiments, the mold can be dried either in air or at a temperature of about 50° C. to about 150° C., about 75° C. to about 100° C., about 80° C. to about 140° C., about 55° C. to about 70° C., or about 45° C. to about 125° C. Other elevated drying temperatures include about 50, 55, 60, 65, 70, 75, 80, 85, 90, 95, 100, 105, 110, 115, 120, 125, 130, 135, 140, 145, and 150° C. The mold can be dried for any suitable amount of time needed for drying at the selected temperature. Without intending to be bound by theory, it is believed that the powder loaded in the mold remains in place due to Vander Waal force.

In embodiments, after the powder is loaded into the mold, the mold can be sintered. Sintering time and temperature will depend on the powder that was loaded into the mold. For example, in an embodiment, a mold loaded with silicon carbide or alumina can be sintered at a temperature of about 1500° C. In accordance with an embodiment, a mold loaded with actinide can be sintered at a temperature of about 1000° C. to about 1800° C., about 1000° C. to about 1500° C., about 1200° C. to about 1600° C., about 1500° C. to about 1700° C., and about 1100° C. to about 1300° C. After sintering, the shaped powder can be removed from the mold. In embodiments, the mold is decomposed at the sintering temperature, thereby resulting in the shaped powder being free of the mold after sintering.

In embodiments, the mold can be cleaned and dried prior to immersing in the suspension. This can, for example, be useful to remove any dust or other contaminants. For example, in embodiments, the mold can be cleaned with an alcohol and dried. For example, in embodiments, the alcohol can be ethanol. In embodiments, the cleaning can include an ultrasonic bath, for example, an ethanol ultrasonic bath. In an embodiment, the mold is cleaned in an ultrasonic ethanol bath for about 10 minutes and dried in an oven at a temperature of about 50° C. for about 10 minutes.

Embodiments of the disclosure beneficially allow for a variety of molds having multiple and intricate micron-sized cavities, channels, reservoirs or other openings to be filled. For ease of reference such openings, cavities, channels, and reservoirs will be referenced as "features" of the mold to be filled. For example, a mold can have one or more micron-sized features. For example, a mold can have an interconnecting network of micron-sized features. For example, the micron-sized feature can be a microchannel. In any of the embodiments, the mold can include one or more microchannels. In any of the embodiments, the microchannels can be interconnected. In any of the embodiments, the microchannels can extend in any desired direction. In accordance any of the embodiments, the microchannels or other micron-sized features can have any suitable cross-sectional shape. For example, the microchannels or other micron-sized features can have a rectangular, square, circular, elliptical, hexagonal, heptagonal, triangular, or any other suitable cross-sectional shape. In embodiments having multiple, micron-sized features, the micron-sized features can be uniform having the same size and cross-sectional shape or the micron-sized features can have different sizes and/or cross-sectional shapes.

The micron-sized feature(s) of the mold can have any cross-sectional width or diameter. For example, the micron-sized feature can have width or diameter of about 1 μm to 50 μm, about 2 μm to about 25 μm, about 1 μm to about 10 μm, about 2 μm to about 10 μm, about 5 μm to about 50 μm, about 10 μm to about 25 μm, about 1 μm to about 5 μm. Other suitable widths or diameters include, for example, about 1, 2, 3, 4, 5, 6, 7, 8, 9, 10, 11, 12, 13, 14, 15, 16, 17, 18, 19, 20, 22, 24, 26, 28, 30, 32, 34, 36, 38, 40, 42, 44, 46, 48, or 50 μm. A mold having more than one micron-sized feature can have features with the same or different cross-sectional widths or diameters. A micron-sized feature can have a uniform or varied cross-section width or diameter.

The micron-sized feature(s) of the mold can have a length from about 10 μm to about 50 cm, about 10 μm to about 100 μm, about 1 cm to about 50 cm, about 1 mm to about 100 mm, about 10 μm to about 1500 μm, or any other suitable range therebetween. The length of the micron-sized feature can depend on the application and can be tailored as needed for desired applications. Methods in accordance with embodiments of the disclosure advantageously allow long micron-sized features, for example, of up to 50 cm or more, to be filled with a powder along then entire length. A mold having more than one micron-sized feature can have features of the same length or of different lengths.

In embodiments, the mold can have a plurality of micron-sized features, each micron-sized feature having an opening disposed on the same surface of the mold.

The mold can be formed of any suitable material. Advantageously, embodiments of the method allow for use of molds formed of low-melting polymers and can allow for filling of such low-melting polymer molds without damage to the mold. In an embodiment, the mold is formed by three-dimensional printing of a polymer. In an embodiment, the mold is formed by three-dimensional printing of a UV cured polymer. Embodiments of the disclosure can be useful for loading microchannel reactors, microchips, for example, for drug delivery, actinide materials loaded for nuclear fuel manufacturing, for example, with hierarchical structures.

In accordance with embodiments, the suspension can be a colloidal suspension. In accordance with embodiments, the suspension can be made by first suspending the surfactant in the dispersant and then mixing the powder into the suspension to suspend the powder. In embodiments, the powder and the surfactant can be suspended in the dispersant simultaneously or substantially simultaneously.

The powder included in the suspension can have, in embodiments, nano-sized and/or micron-sized particles. For example, the average particle size of the powder can be about less than about 100 μm, less than about 75 μm, less than about 60 μm, less than about 50 μm, less than about 25 μm, less than about 10 μm, or less than about 1 μm. In various embodiments, the average particle size of the powder can be about 1 nm to less than about 100 μm, about 10 nm to about 75 μm, about 50 nm to about 10 μm, about 1 nm to about 1 μm, about 10 nm to about 100 nm, about 1 nm to about 50 nm, about 25 nm to about 75 nm, about 1 μm to about 5 μm, about 5 μm to about 75 μm, about 500 nm to about 1 μm, and about 750 nm to about 5 μm. Other suitable average particle sizes include about 1 nm, 5 nm, 10, nm, 15 nm, 20 nm, 25 nm, 30 nm, 35 nm, 40 nm, 45 nm, 50 nm, 75 nm, 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, 1 μm, 2 μm, 3 μm, 4 μm, 5 μm, 10 μm, 20 μm, 30 μm, 40 μm, 50 μm, 60 μm, 70 μm, 80 μm, 90 μm, and 99 μm.

A variety of powders can be loaded into molds in methods in accordance with embodiments of the disclosure. For example, the powder can be or include nickel, copper, chromium, nickel alloys, copper alloys, chromium alloys, uranium, uranium oxides uranium alloys, silicon carbide, alumina, actinide, yttria stabilized zirconia (YSZ), $CeO_2$, $SnO_2$, SIC, MGB, $Al_2O_3$, PZT, alumina, B-alumina, $Al_2O_3/ZrO_2$. In various embodiments, the powders can have spherical and/or non-spherical particles.

In accordance with embodiments, the powder can be present in the suspension in an amount of about 10% to about 40% by weight of the suspension, about 15% to about 35% by weight of the suspension, about 25% to about 40% by weight of the suspension, and about 10% to about 30% by weight of the suspensions. For example, the powder can be present in the suspension in an amount of about 10, 12, 14, 16, 18, 20, 22, 24, 26, 28, 30, 32, 34, 36, 38, and 40% by weight of the suspension. In embodiments, loading up to and in excess of 70 wt % may be achieved, for example, where the powder size distribution varies from about 15 to about 30 nm, and/or the powder has low density. For example, high loading up to and in excess of 70 wt % can be achieved for powders such as low-density ceramics, for example, such as SiC and $Al_2O_3$.

A variety of surfactants can be included in the suspension and can be selected based on the powder selected and the particle size of the powder. For example, the surfactant can be one or more of cetyltrimethylammonium based cationic surfactants, and cetryltrimethylammonium-hydrogenosulphate. For example, the surfactant can be cetyltrimethylammonium chloride and/or certmonium bromide.

The surfactant can be present in the suspension in an amount of about 1% to 5% by weight of the suspension, about 1% to about 2% by weight of the suspension, about 2% to about 4% by weight of the suspension, and about 1% to about 3% by weight of the suspension. Other suitable amounts include, about 1, 1.5, 2, 2.5, 3, 3.5, 4, 4.5, and 5% by weight of the suspension.

The suspension can further include a dispersant. Suitable dispersants include one or more of the dispersants listed in tables 1 and 2 below and combinations thereof. The dispersant can be selected in various embodiments based on the powder selected. For example, high density powders may require higher viscosity dispersants to remain suspended as compared to lower density powders. In embodiments, lower density powders such as alumina can be dispersed in water.

TABLE 1

Dispersants

| DISPERSANTS | VISCOSITY (CP) = $10^{-3}$ $NSM^{-2}$ | RELATIVE DIELECTRIC CONSTANT |
|---|---|---|
| METHANOL | 0.557 | 32.63 |
| ETHANOL | 1.0885 | 24.55 |
| N-PROPANOL | 1.9365 | 20.33 |
| ISO-PROPANOL | 2.0439 | 19.92 |
| N-BUTANOL | 2.5875 | 17.51 |
| ETHYLENE GLYCOL | 16.265 | 37.7 |
| ACETONE | 0.3087 | 20.7 |
| ACETYL ACETONE | 1.09 | 25.7 |
| WATER | 0.00152 | 80.1 |

Table 2 further provides some dispersant systems and an example of a powder which can be included in the suspension. The combinations of table 2 are illustrative and other combinations are contemplated herein.

TABLE 2

List of dispersant systems for various powders

| DISPERANT SYSTEMS | POWDER MATERIALS TO BE DEPOSITED |
|---|---|
| ACETONE-ETHANOL | YTTRIA STABILIZED ZIRCONIA (YSZ) |
| CYCLOHEXANE | YSZ |
| ETHYL ALCOHOL-WATER | $CEO_2$, $SNO_2$, SIC |
| ETHYL ALCOHOL-ACETYL ACETONE | MGO, $AL_2O_3$ |
| GLACIAL ACETIC ACID | PZT |
| DICHLOROMETHANE | B-ALUMINA |
| METHYL ETHYL KETONE | $AL_2O_3$ |
| TOLUENE-ETHYL ALCOHOL | $AL_2O_3$ |
| WATER | $AL_2O_3$, $AL_2O_3/ZRO_2$ |

The dispersant can be present in the suspension in an amount of about 55% to about 89% by weight of the suspension, about 60% to about 80% by weight of the suspension, about 55% to about 75% by weight of the suspension, and about 55% to about 65% by weight of the suspension. Other suitable amounts include about 55, 56, 57, 58, 59, 60, 61, 62, 63, 64, 65, 66, 67, 68, 69, 70, 71, 72, 73, 74, 75, 76, 77, 78 79, 80, 81, 82, 83, 84, 85, 86, 87, 88, and 89% by weight of the suspension.

In various embodiments, the suspension can also include a buffer or other pH controlling compound. For example, the suspension can include HCl, $H_2SO_4$, acetic acid, NaOH. Other known buffers can be used in the suspension, as well.

EXAMPLE

A mold having a plurality of hexagonal microchannels was loaded with an actinide powder. The microchannels had a width of about 10 microns. The microchannels were arranged such that the openings of the channels were disposed on a common surface of the mold and the microchannels extended through the mold in parallel to adjacent microchannels.

Prior to loading, the mold was cleaned and dried. The mold was cleaned in an ultrasonic bath of ethanol for 10 minutes and then dried in an oven at 50° C. for 10 minutes.

The mold was immersed in a colloidal suspension containing actinide powder. The actinide powder had an average particle size of about 50 nm to 100 nm and included spherical and non-spherical particles. The colloidal suspension included about 40 wt % of the actinide powder, 1.5-2 wt % cetyltrimethylammonium-hydrogenosulphate (CTAH-S)_as a surfactant, 0.01 moles of and 1 liter of Isopropanol as a dispersant, the wt % being based on the total weight of the suspension. The suspension was made by first mixing the actinide powders surfactant (CTAHS). Then this mixture was dispersed in Isopropanol with a help of a magnetic stirrer, for 3-5 hours. The colloidal solution was further stabilized with 15 kHz ultrasonic exposure for 1 hour.

Figure 2A:
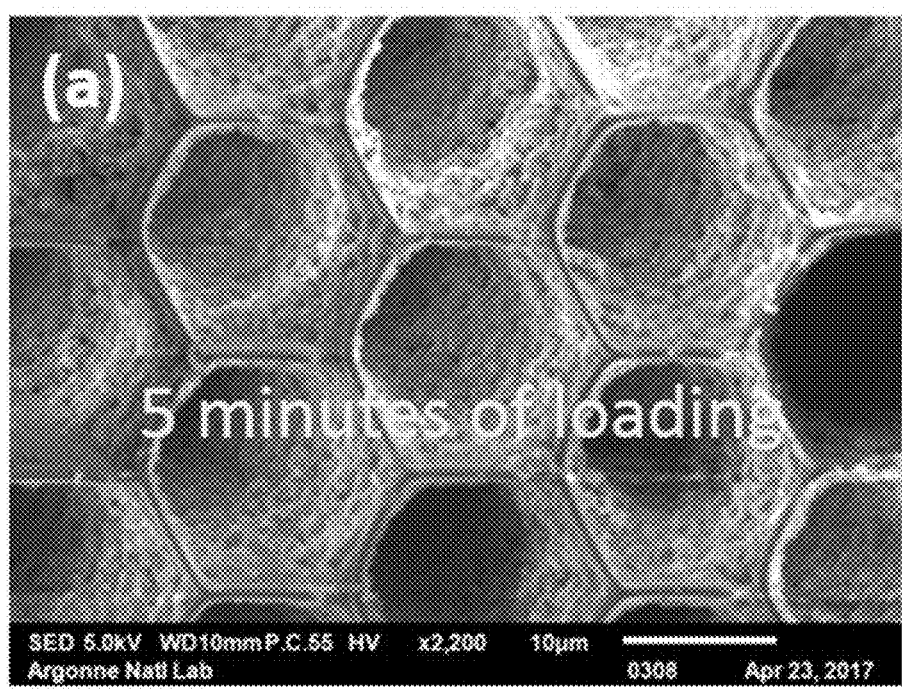
FIG. 2A is a microscopy image of a mold loaded with powder after 5 minutes of loading in accordance with an embodiment of the disclosure.
Figure 2B:
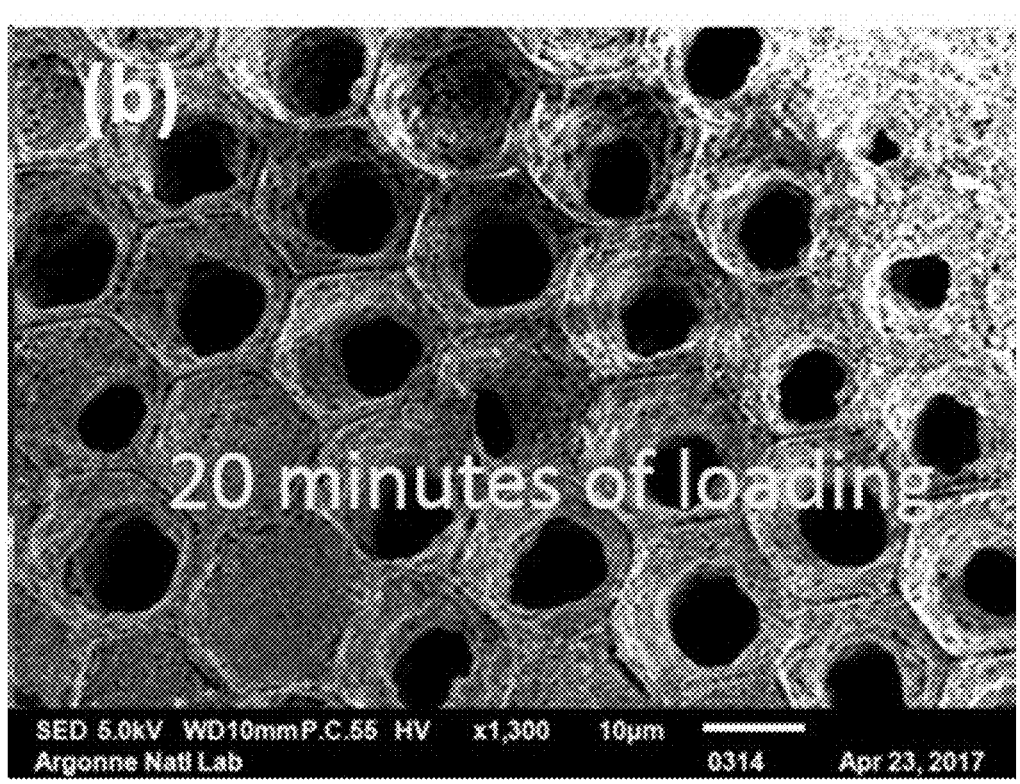
FIG. 2B is a microscopy image of a mold loaded with powder after 20 minutes of loading in accordance with an embodiment of the disclosure.
Figure 2C:
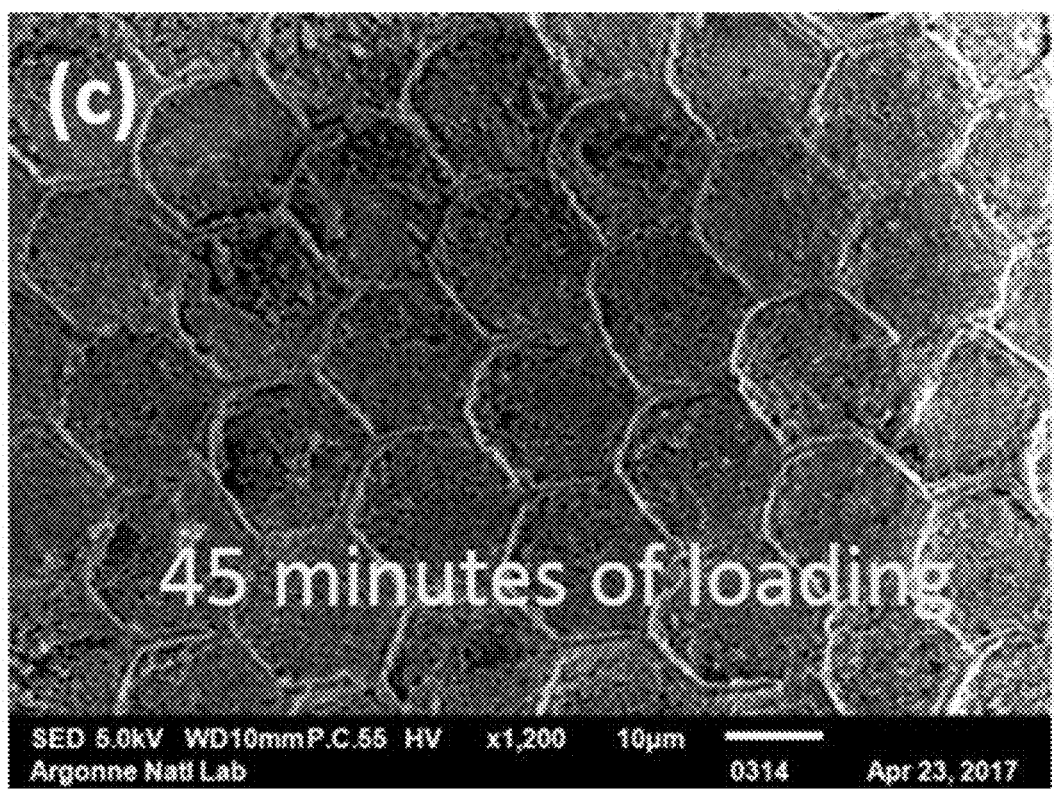
FIG. 2C is a microscopy image of a mold loaded with powder after 45 minutes of loading in accordance with an embodiment of the disclosure.

The colloidal suspension containing the mold was heated to a temperature of 70° C. to initiate settling of the particles out of suspension. After the suspension was heated, an ultrasonic wave having a frequency of 1 kHz was applied. FIGS. 2A-2C illustrate the stages of filling after 5 minutes, 20 minutes, and 45 minutes, respectively, of application of heat and the wave.

The mold when then removed from the suspension, decanted, and dried. The decanting process including storing the filled mold in a dry box for 1-2 hours to allow the remaining dispersant to be removed, leaving a semi-dried filled mold. This was then put inside a box furnace for drying at about 100° C. to about 120° C. for one hour.

The dried, loaded mold when then sintered at a temperature of about 1500° C. The final shaped product had a density of 75-80% of the theoretical value, with remaining amount representing porosity, and with about 60% to about 70% loading.

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict embodiments for purposes of illustration only. One of ordinary skill in the art will readily recognize from the following discussion that alternative embodiments of the structures and methods illustrated herein may be employed without departing from the principles described herein.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method of loading powder into a mold, comprising:
    immersing the mold comprising one or more microchannels into a suspension comprising the powder and a surfactant suspended in a dispersant, wherein the powder comprises particles having an average particle size of less than 100 µm, wherein the mold is substantially entirely covered by the suspension;
    heating the suspension having the mold immersed therein under a temperature condition suitable to lower the stability of the particles of the powder in the suspension such that the particles settle out of solution and into the one or more microchannels; and
    applying an ultrasonic wave to the heated suspension to further settle the particles of the powder into the one or more microchannels thereby filling the one or more microchannels of the mold with the powder to provide a filled mold having the powder disposed in the one or more microchannels, wherein the surfactant is one or more of cetyltrimethylammonium based cationic surfactants, and cetryltrimethylammonium-hydrogenosulphate.

2. The method of claim 1, wherein the ultrasonic wave has a vibration frequency in a range of 5 KHz to 5 MHz.

3. The method of claim 1, wherein the suspension is heated to a temperature of about 50° C. to about 150° C.

4. The method of claim 1, wherein the one or more microchannels has a width or diameter of about 1 µm to about 50 µm.

5. The method of claim 1, wherein the one or more microchannels has a length of about 10 µm to about 50 cm.

6. The method of claim 1, wherein the dispersant is one or more of water, methanol, ethanol, n-propanol, iso-propanol, N-butanol, ethylene glycol, acetone, acetyl acetone, cyclohexane, ethyl alcohol, glacial acetic acid, dichloromethane, methyl ethyl ketone, and toluene.

7. The method of claim 5, further comprising removing the mold and decanting the mold.

8. The method of claim 1, further comprising removing the filled mold from the suspension and drying the filled mold.

9. The method of claim 8, wherein the mold is dried at a temperature of about 50° C. to about 150° C.

10. The method of claim 1, further comprising removing the filled mold from the suspension after applying the ultrasonic wave and sintering the filled mold having the powder loaded in the one or more microchannels to thereby form a shaped product.

11. A method for forming a shaped product, comprising:
    immersing a mold comprising one or more microchannels into a suspension comprising the powder and a surfactant suspended in a dispersant, wherein the powder comprises particles having an average particle size of less than 100 µm, wherein the mold is substantially entirely covered by the suspension;
    heating the suspension having the mold immersed therein under a temperature condition suitable to lower the stability of the particles of the powder in the suspension such that the particles settle out of solution and into the one or more microchannels;
    applying an ultrasonic wave to the heated suspension to further settle the particles of the powder into the one or more microchannels thereby filling the one or more microchannels of the mold with the powder; and
    removing the mold from the suspension after applying the ultrasonic wave and sintering the mold having the powder loaded in the one or more microchannels to thereby form the shaped product,
    wherein the mold is sintered at a temperature of about 1000° C. to about 1800° C.

12. The method of claim 1, wherein at least a portion of the particles of the powder are non-spherical.

13. The method of claim 1, wherein the suspension is a colloidal suspension.

14. The method of claim 1, wherein the powder is present in the suspension in an amount of about 10% to about 40% by weight, based on the total weight of the suspension.

15. A method of loading powder into a mold, comprising:
    immersing the mold comprising one or more microchannels into a suspension comprising the powder and a surfactant suspended in a dispersant, wherein the powder comprises particles having an average particle size of less than 100 µm, wherein the mold is substantially entirely covered by the suspension;
    heating the suspension having the mold immersed therein under a temperature condition suitable to lower the stability of the particles of the powder in the suspension such that the particles settle out of solution and into the one or more microchannels; and
    applying an ultrasonic wave to the heated suspension to further settle the particles of the powder into the one or more microchannels thereby filling the one or more microchannels of the mold with the powder to provide a filled mold having the powder disposed in the one or more microchannels, wherein the powder comprises actinide.

16. The method of claim 1, wherein the powder comprises metallic particles.

17. The method of claim 1, wherein the heat and ultrasonic wave are applied simultaneously.

18. The method of claim 1, wherein the ultrasonic wave is applied after the suspension reaches a temperature of about 70° C. to about 150° C., and heating is maintained during application of the ultrasonic wave.

19. A method of loading powder into a mold, comprising:
    immersing the mold comprising one or more microchannels into a suspension comprising the powder and a surfactant suspended in a dispersant, wherein the powder comprises particles having an average particle size of less than 100 µm, wherein the mold is substantially entirely covered by the suspension;
    heating the suspension having the mold immersed therein under a temperature condition suitable to lower the stability of the particles of the powder in the suspension such that the particles settle out of solution and into the one or more microchannels; and
    applying an ultrasonic wave to the heated suspension to further settle the particles of the powder into the one or more microchannels thereby filling the one or more microchannels of the mold with the powder, wherein the mold is made from a UV curable polymer.

* * * * *